(12) United States Patent
Wood et al.

(10) Patent No.: US 9,124,148 B2
(45) Date of Patent: Sep. 1, 2015

(54) PORTABLE GENERATOR COVER (71) Applicants: David G Wood, Deerfield, NH (US);
Mark H Miller, Ayer, MA (US)

(72) Inventors: David G Wood, Deerfield, NH (US);
Mark H Miller, Ayer, MA (US)

(73) Assignee: MILLER WOOD INNOVATIONS, LLC, Ayer, MA (US)

( * ) Notice: Subject to any disclaimer, the term of this patent is extended or adjusted under 35 U.S.C. 154(b) by 0 days.

(21) Appl. No.: 13/625,066

(22) Filed: Sep. 24, 2012

(65) Prior Publication Data

US 2013/0074421 A1 Mar. 28, 2013

Related U.S. Application Data (60) Provisional application No. 61/538,819, filed on Sep. 24, 2011.

(51) Int. Cl.
*H02K 5/10* (2006.01)
*B62J 7/08* (2006.01)
*E04H 15/48* (2006.01)
*F02B 63/04* (2006.01)

(52) U.S. Cl.
CPC ... *H02K 5/10* (2013.01); *B62J 7/08* (2013.01); *E04H 15/48* (2013.01); *F02B 63/047* (2013.01)

(58) Field of Classification Search
CPC ......... A01F 25/10; A01F 25/16; E04B 1/344; E04H 15/48; B62J 7/08; H01K 5/10; F02B 63/047
USPC ............... 52/3, 64, 66, 69, 70, 71, 90.1, 91.1; 135/87, 143; 310/84, 89; 290/1 A; 24/614, 615
See application file for complete search history.

(56) References Cited

U.S. PATENT DOCUMENTS

| | | | | |
|---|---|---|---|---|
| 551,977 | A * | 12/1895 | Tent | 5/113 |
| 3,578,003 | A * | 5/1971 | Everett | 135/137 |
| 3,807,104 | A * | 4/1974 | Webster | 52/70 |
| 4,237,914 | A * | 12/1980 | Gantz | 52/2.19 |
| 4,279,105 | A * | 7/1981 | Cameron | 52/71 |
| 4,823,822 | A * | 4/1989 | Maya | 135/87 |
| 4,838,525 | A * | 6/1989 | Snow et al. | 256/26 |
| 4,958,652 | A * | 9/1990 | Maya | 135/87 |
| 6,883,531 | B1 * | 4/2005 | Perttu | 135/151 |
| 7,302,770 | B2 * | 12/2007 | Glass | 40/610 |
| 7,325,281 | B1 * | 2/2008 | Willems et al. | 24/302 |
| 7,591,510 | B1 * | 9/2009 | Giampavolo | 297/256.17 |
| 2002/0158433 | A1 * | 10/2002 | de Naurois et al. | 280/33.993 |
| 2003/0097736 | A1 * | 5/2003 | Blankenship | 24/302 |

* cited by examiner

*Primary Examiner* — Jeanette E Chapman
*Assistant Examiner* — James Buckle, Jr.

(57) ABSTRACT

A lightweight, foldable cover adapted for attachment to a portable electric generator permits the generator to be operated while covered and shielded from weather. The cover includes rigid or semi-rigid sides hingeably joined and held in position with flexible straps. The cover allows unimpeded exhaust and airflow underneath the cover, and unimpeded access to controls and outlets. The flexible straps attach to the cover and the frame of the generator. The straps are adjustable to accommodate different generator frame sizes, and include quick release devices to allow rapid attachment to, or detachment from the generator frame for refueling or storage. When removed the cover folds nearly flat for storage.

18 Claims, 6 Drawing Sheets

PORTABLE GENERATOR COVER

BACKGROUND

1. Field of Invention

This invention relates to cover structures, specifically to covers which may be utilized to protect a portable electric generator in the outdoors and while running or idle.

2. Description of the Prior Art

Portable electric generators are popular for generating electricity in locations without electrical service and as backup power for electrical power outages. They are used outside of inhabited buildings because of the toxic and noxious fumes produced by the combustion engines that power there, in such locations, they are exposed to all manner of weather and are typically not well protected therefrom.

When a portable generator is not running and the engine has cooled, it may be covered with a soft vinyl or coated fabric cover, of the many styles commercially available. Such covers do offer protection from weather; however, they are only useful when the generator is not running, since during operation they would block the controls and soon melt from the close proximity to the engine exhaust and hot engine components.

Manufacturers of portable generators have recognized the need for weather resistance and have incorporated corrosion-resistant coatings and paint to various components of their portable generators. Furthermore, most have so configured their products to have the fuel tank—usually made of a UV resistant polymer—substantially cover the engine and electrical generator portions underneath. In U.S. Patent Application No. 2011/0095540, Jackson, et al. illustrates a generator so configured with the large fuel tank on top, and furthermore teaches a pair of small moveable covers for weather protection, the first which covers the control panel and the second which covers the outlets. However, Jackson's application does not provide for weather protection for the tank, fuel cap, frame, wheels, and other components. In U.S. Patent Application 2010/0320774, Bindhammer teaches a pivoting fuel tank for the purpose of facilitating maintenance; however, the shape of the tank will also afford a measure of similarly limited weather protection.

In contrast to soft vinyl covers for generators from weather, others have used rigid structures to protect generators from weather. Many people dedicate a separate outbuilding to protect their generators, such as a garden shed. In U.S. Pat. No. 2,424,340, Sterrett teaches a complex rollaway cover for a large generator. In U.S. Pat. No. 4,595,841, Yaguchi teaches a complete wrap-around but removeable cover. In U.S. Pat. No. 5,121,715, Nogami teaches a fully enclosed generator with special provisions for ventilation and cooling. In U.S. Pat. No. 7,642,665, Konop, et. al. teaches a pair of hingedly mounted hoods for protecting a generator while providing access to its components. All of the above referenced inventions suffer from various shortcomings, among them significant bulkiness, weight, cost, and in the case of Konop et. al., insufficient weather protection for the entire generator.

Other covers and tents in the prior art which provide for weather protection include U.S. Pat. Nos. 6,276,742; 7,478,862; and U.S. Patent Applications 2009/0038766; and 2011/0226297, all of which apply to vehicles. The Deng patent (U.S. Pat. No. 6,276,742) teaches a cover that is built into the structure of the vehicle and not easily removeable. The Wiegel et. al. patent (U.S. Pat. No. 7,478,862) teaches a spooled fabric which is extended around an item to be protected from weather. The Smith, Jr. application (2009/0038766) teaches a collapsible fabric sun-screen structure attached with suction cups to a vehicle. The Rewis application (2011/0226297) teaches a collapsible canopy frame and cover, attachable to the back of an automobile or truck for sun protection during tailgating events.

Collapsible A-frame structures used for other purposes include U.S. Pat. Nos. 837,937; 3,807,104; and 4,237,914. The Legg patent (U.S. Pat. No. 837,937) teaches a hinged roof used for a knockdown chicken house; the Webster patent (U.S. Pat. No. 3,807,104) teaches a portable structure comprising a hinged roof and open floor—essentially, a portable shed. The Gantz patent (U.S. Pat. No. 4,237,914) teaches a portable, two-sided tent of rigid panel or fabric panel construction, adapted to be used on a child's bed.

All of the covers, canopies, tents, and enclosures either in commercial use or in the patent literature known to applicants and that could be applied to protect a portable generator from the weather suffer from one or more of the following disadvantages:

a) The cover is heavy;
b) The cover does not span the portable generator entirely;
c) Particularly, the cover does not protect the fuel inlet from precipitation, especially snow and ice;
d) The cover cannot be used while the generator is running;
e) The cover is difficult to remove for access to the components of the generator; and/or
f) The cover is not adjustable for various generator sizes

OBJECTS OF THE INVENTION

It is one object of the present invention to provide a cover for portable generators to be used outdoors while the generator is running.

Another object of the present invention is to provide a cover that covers a generator entirely as viewed from above, thereby protecting the generator as a whole from precipitation.

Another object of the present invention is to protect the fuel cap from precipitation, yet provide for easy access for refueling.

Another object of the present invention is to provide a cover that is easily and quickly attachable to and removable from a portable generator, to facilitate storage of the cover and easy access to the generator for any purpose.

An additional object of the present invention is to provide a cover that may easily be adjusted to fit a variety of generator sizes;

A still further object of the present invention is to provide a cover that is lightweight for easy handling.

Still further objects and advantages will become apparent from a consideration of the following drawings and description.

BRIEF DESCRIPTION OF THE DRAWINGS

Detailed descriptions of preferred embodiments of the present invention will be made with reference to the following drawings.

DETAILED DESCRIPTION OF THE PREFERRED EMBODIMENTS

The following is a description of the preferred embodiments of the present invention and will be understood by reference to the drawings. Also, as used herein the term "generator" is intended as short-hand for portable electric generator, including the frame, engine, genset, and ancillary components.

Figure 1:
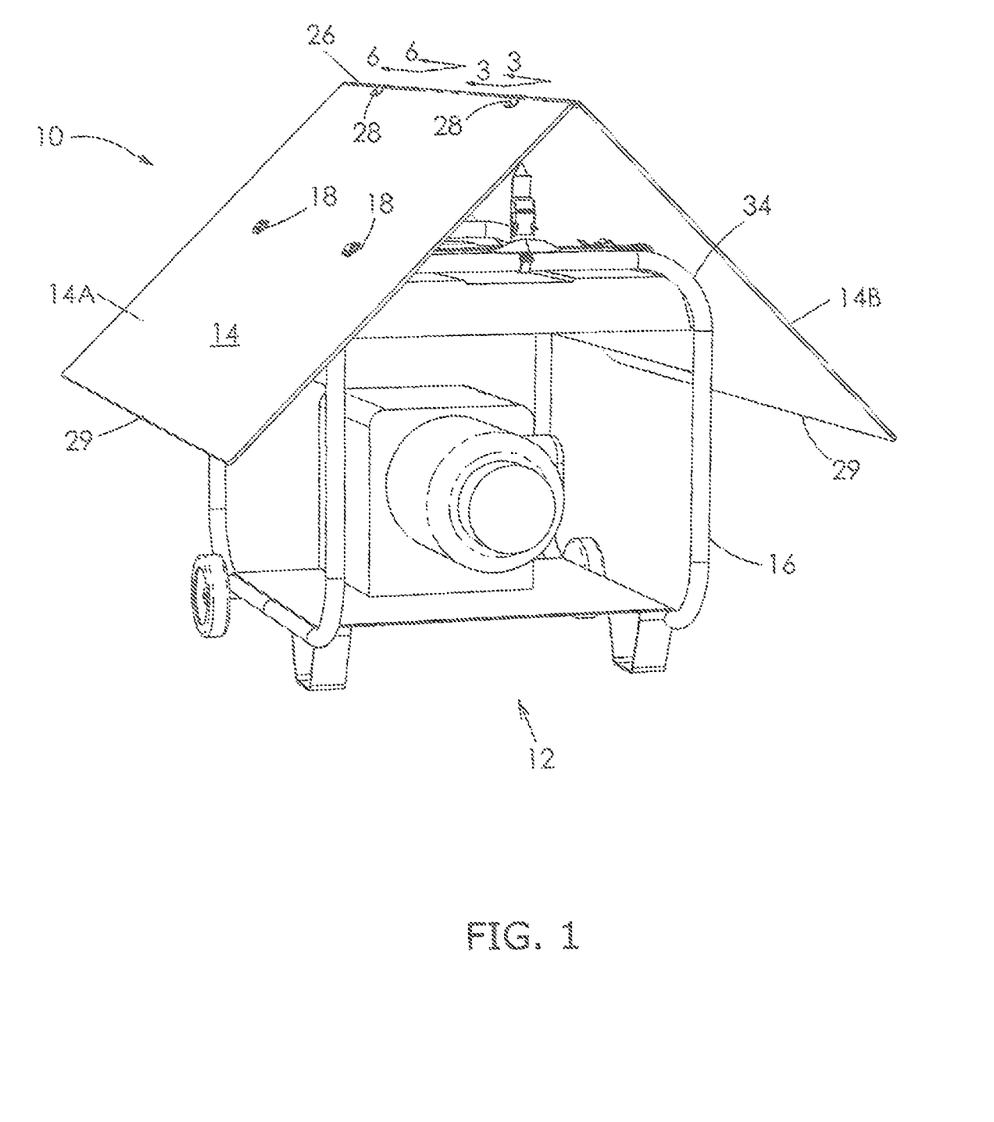
FIG. 1 is a perspective view of the preferred embodiment of the present invention shown mounted to a portable generator.
Figure 2:
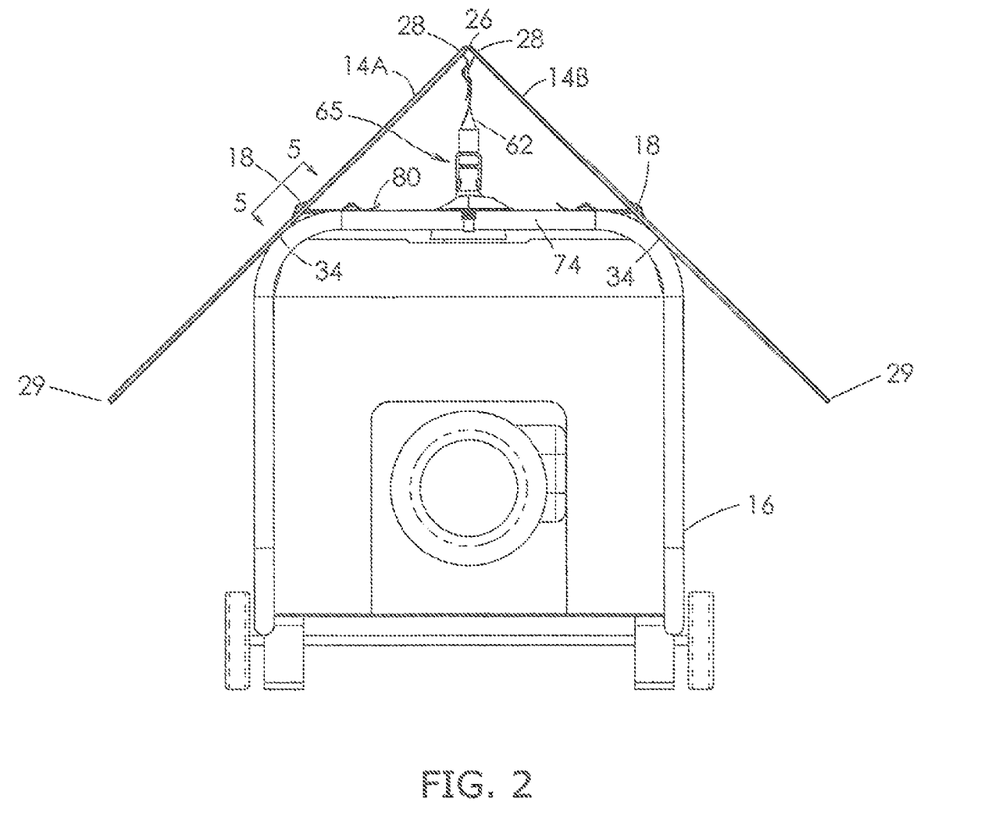
FIG. 2 is a side view in elevation of the embodiment illustrated in FIG. 1.

As illustrated in FIGS. 1 and 2, a cover is indicated generally by reference numeral 10 and shown attached to a generator 12. The cover 10 includes a roof 14, having a left side 14A and a right side 14B that sits upon a frame portion 16 of generator 12, and completely covers the generator as viewed from above. Contact between roof 14 and generator 12 occurs at upper corners 34 of frame 16. Roof sides 14A and 14B have lower lateral edges 29, and are made of sufficient size so that lower edges 29 will be positioned away from frame 16 and below upper corners 34 of generator 12. This keeps precipitation dripping from lower edges 29 away from generator 12, yet allows for unimpeded access to the controls and outlets of the generator.

Roof sides 14A and 14B may be made from a polymer or other substantially rigid or semi-rigid material and may be advantageously lightened in weight by utilizing foamed or corrugated polymers. Roof sides 14A and 14B are hingedly joined at an apex 26, the details of which will be described hereinafter. Sides 14A and 14B further have a pair of lower slots 18 and a pair of upper slots 28 formed for connections to be described in an explanation of FIGS. 2, 3, and 5.

Roof 14 is secured to the frame 16 by a pair of vertical straps 62, and a pair of horizontal straps 80, as illustrated in FIG. 2. Said straps are preferably made of woven nylon or polypropylene, however, it will be appreciated that any flexible strap or rope material could potentially serve this function as well. One vertical strap 62 and one horizontal strap 80 is positioned at each end of roof 14 for stability; FIG. 2 is representative of the construction at either end. Each vertical strap 62 is attached at its upper end to roof 14 through slots 28 adjacent to apex 26. Each vertical strap 62 is secured at its lower end to a horizontal rail portion 74 of frame 16. The connection of strap 62 to rail 74 is accomplished by a releasable connection indicated generally by reference numeral 65. Each horizontal strap 80 attaches to left side 14A, and to right side 14B, through slots 18. All straps 62 and 80 are adjustable for effective length. The precise details of strap attachments and adjustment means will be described immediately following, but for the moment FIG. 2 will serve to describe the theory behind the construction and operation of cover 10.

The effective length of horizontal straps 80 controls the roof angle created between sides 14A and 14B of cover 14; once straps 80 are taut, the angle cannot increase further. In practice, horizontal straps 80 are first adjusted with roof 14 sitting upon frame 16 until the angle between sides 14A and 14B is suitable, typically between 90 and 120 degrees. It can be appreciated that the appropriate angle would depend upon the size of frame 16 of the particular generator in question. Subsequent to setting this angle, vertical straps 62 are adjusted for length to develop vertical tension in the straps. This developed tension tends to pull apex 26 downward, which tends to cause the roof angle to increase, because sides 14A and 14B will slide at the upper corners 34 of frame 16. However, the angle is prevented from increasing due to the countervailing tension in horizontal straps 80. Therefore, the tension in vertical straps 62 and horizontal straps 80 are in opposition to one another, and this balanced tension serves both to maintain the roof angle between sides 14A and 14B, and to maintain tight contact between roof 14 and frame 16 at its upper corners 34.

Figure 3:
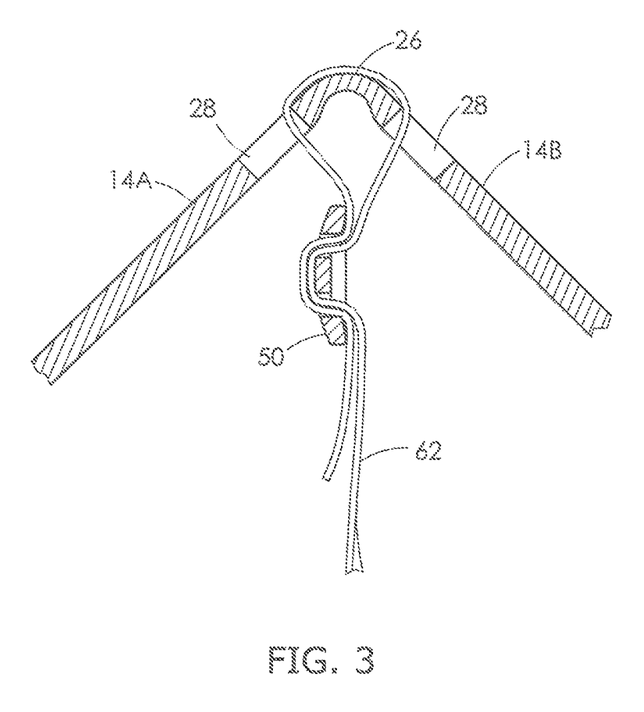
FIG. 3 is partial section view taken along lines 3-3 in FIG. 1.

Referring to FIG. 3, vertical strap 62 passes through a slider 50, then through upper slot 28 in right side 14B, over apex 26, back through upper slot 28 of left side 14A, and back through slider 50 again. Sliders of the type shown at reference numeral 50 and illustrated elsewhere herein are well known in industry and serve the dual purposes of securing straps while still allowing for adjustment of effective length. It should be noted that there are other devices and means, such as double-D rings, that could serve as alternatives for attaching and/or adjusting the straps. These alternatives would be obvious to one skilled in the art and should not be construed to be outside the scope of this invention.

Figure 4:
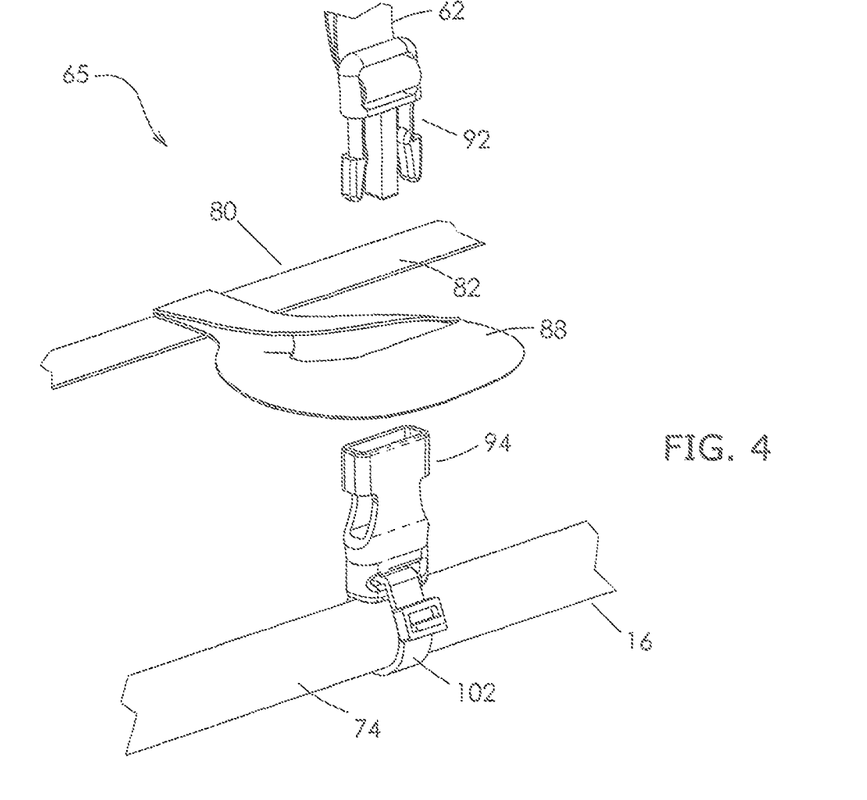
FIG. 4. is an exploded perspective view of certain components shown in FIG. 2 for greater clarity.

FIG. 4 is an exploded view of one of two releasable connections indicated generally by reference numeral 65 shown in FIG. 2. The lower end of vertical strap 62 is connected to a male side release buckle portion 92. A mating female side release buckle portion 94 is secured with a heavy-duty zip-tie 102 near the center of the upper rail 74 of frame 16. Horizontal strap 80 comprises a straight portion 82 and a loop portion 88 formed near the middle of straight portion 82. Loop 88 may be formed from a twist in straight portion 82 or from a second length of strap material; and it may be fastened by sewing, heat staking, riveting, or any similar process. The purpose of loop 88 is to limit the amount of sliding that can occur between roof 14 and upper frame corners 34, and assists in keeping roof 14 centered on frame 16.

During attachment of cover 10 to generator 12, loops 88 are placed over and around female side release buckle portions 94, and then male side release buckle portions 92 are snapped into female portions 94. Thus, with the simple manual attachment or release of only two side release buckles, the cover may be secured to, or removed from, the generator. It should be understood that a "side release buckle" could easily be replaced with a front-release buckle, a toggle buckle, or any of several other quick-release devices known in the art and used with flexible straps or ropes, without departing from the scope of this invention.

Figure 5:
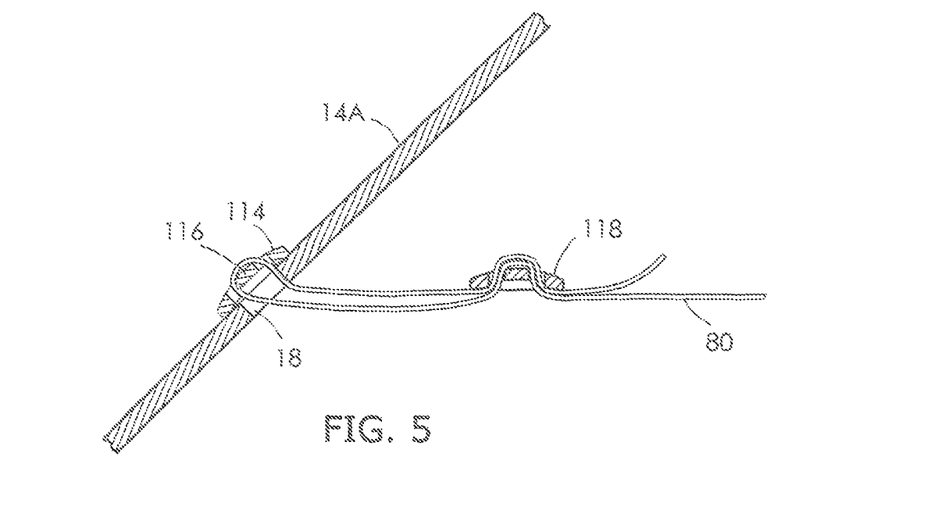
FIG. 5 is a partial section view taken along lines 5-5 in FIG. 2.

Referring now to FIG. 5, each horizontal strap 80 passes through a slider 118, then through one of the slots 18 in left side 14A, through a slider 114, around a center bar portion 116 of the slider 114, back through the same slot 18, and back again through slider 118. In this manner, strap 80 is attached securely to roof side 14A, inasmuch as slider 114 is larger than slot 18 and therefore prevented from passing through said slot. Furthermore, it will be appreciated that slider 118 provides for adjustment of the effective length of strap 80. The construction described in FIG. 5 is repeated for the attachment of the opposite ends of straps 80 to roof right side 14B.

Figure 6:
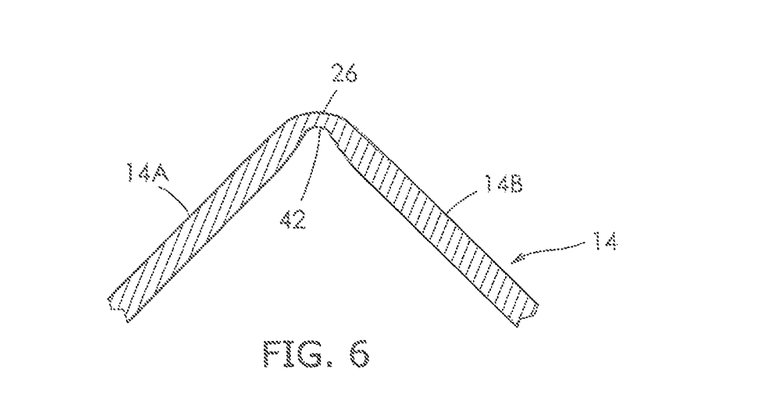
FIG. 6 is a partial section taken along lines 6-6 in FIG. 1.

Considering now the construction detail of roof portion 14, as shown in the section view of FIG. 6, it will be understood that sides 14A and 14B of cover 14 can be made from a single sheet of material. By forming a crease 42 into a single sheet of material and subsequently bending the sheet, it will naturally fold around the narrowed, less rigid crease, and thus form an apex 26 opposite crease 42 as well as sides 14A and 14B. If the material chosen for cover 14 has sufficient resiliency and fatigue strength, crease 42 can serve the function of a "living" hinge, even to the point of allowing sides 14A and 14B to come together for flat storage.

Figure 7:
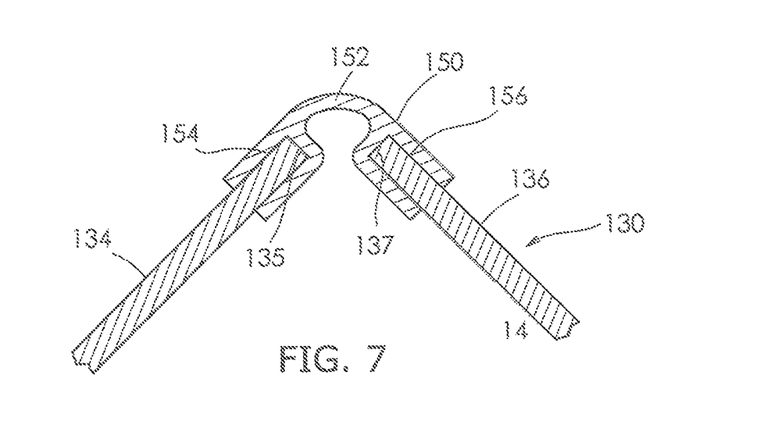
FIG. 7 is an alternative embodiment of the detail shown in FIG. 6.

FIG. 7 illustrates an alternative embodiment to the construction detail of roof 14 from the illustration of FIG. 6. In FIG. 7, a roof portion generally indicated by reference numeral 130 comprises a left roof panel 134 and a right roof panel 136 joined by a flexible hinge 150. Roof panels 134 and 136 include upper longitudinal edges 135 and 137 respectively. Flexible hinge 150 comprises a central resilient portion 152 that terminates in a left side bifurcation 154 and a right side bifurcation 156. Bifurcations 154 and 156 resiliently hold upper edges 135 and 137 respectively. It will be understood that many different types of hinges other than those described herein could be utilized to accomplish the purpose of a hinged connection between roof panels 134 and 136 without departing from the scope of this invention.

Figure 8:
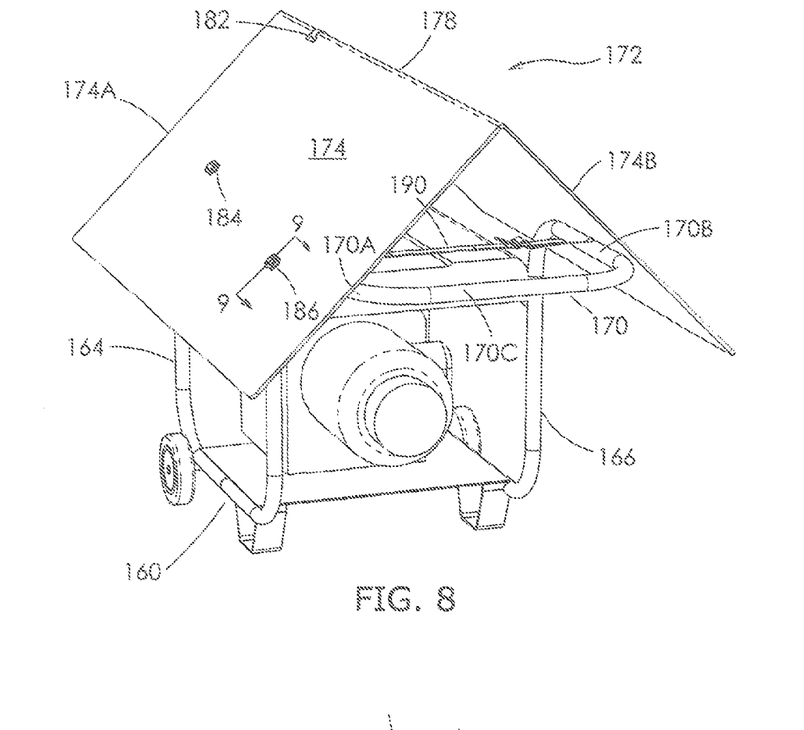
FIG. 8 is an alternative preferred embodiment of the present invention, more suitable to the illustrated alternative portable generator.

Some portable generators have frames sufficiently different from frame 16 in FIG. 1 such that an alternative embodiment to the cover 10 of FIG. 1 needs to be utilized. Referring to FIG. 8, an alternative embodiment may be appreciated. A generator frame 160 includes a far side 164 and a near side 166; near side 166 in turn includes a handle portion 170 projecting outwardly from the frame 160 for the purpose of easily moving the generator. The handle 170 includes left side portion 170A, right side portion 170B, and central portion 170C. Central portion 170C is that portion of the handle gripped by the user when moving the generator. It can be seen from the drawing of FIG. 8 that the near side portion 166 of frame 160 does not include a portion equivalent to upper rail 74 in FIG. 2, and therefore, a vertical strap cannot be used to attach a cover generally indicated by reference numeral 172 to frame 160 at near side 166. This limitation applies only to near side 166 of frame 160; at far side 164, the means of attachment of the cover 172 to frame 160 is identical to that illustrated in FIGS. 1 through 5 and will not be described again here.

Figure 9:
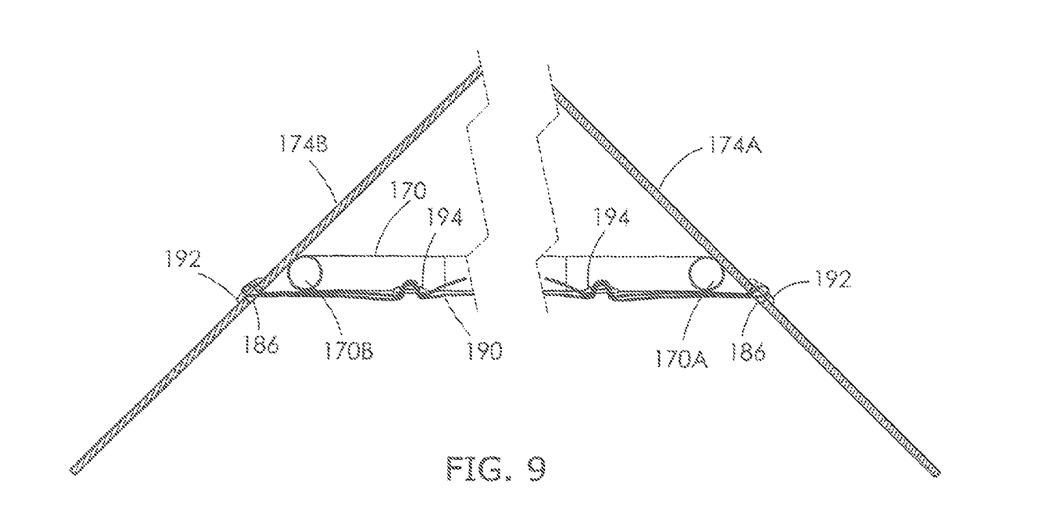
FIG. 9 is a partial section view taken along lines 9-9 in FIG. 8.

As illustrated in FIGS. 8 and 9, cover 172 includes a roof 174, having a left side 174A and a right side 174B that sits upon generator frame 160. Contact between roof 174 and frame 160 occurs at handle portions 170A and 170B at near side 166 of the frame 160. Contact between roof 174 and frame 160 also occurs at upper corners of frame 160 at far side 164. Roof sides 174A and 174B are hingedly joined at an apex 178, in a manner such as previously described in FIG. 6 or FIG. 7. Sides 174A and 174B each include an upper rear slot 182, a lower rear slot 184, and a lower front slot 186. Rear slots 182 and 184 are used for connections of straps in a manner such as previously described in FIGS. 1 through 5. Front slot 186 is formed for communication with a horizontal strap 190 to be further described in reference to FIG. 9.

Referring now particularly to FIG. 9, horizontal strap 190 is positioned along the underside of handle 170, and in tangential contact with left side 170A and right side 170B. Strap 190 communicates with roof sides 174A and 174B by passing through slots 186, through a pair of sliders 192 and back through slots 186, terminating in the space underneath roof 174. The ends of strap 190 are adjustably secured with a pair of sliders 194 located in the space between handle portions 170A and 170B. The effective length of strap 190 is accomplished by moving sliders 194. Said effective length is set to ensure that roof sides 174A and 174B remain in constant contact with handle sides 170A and 170B respectively. Once the effective length of strap 190 has been adjusted as described, it does need to be adjusted again for removal or re-installation of the cover 172 to generator frame 160.

Although the present invention has been described in terms of the preferred embodiments above, various modifications and/or additions to the preferred embodiments would be quickly apparent to someone skilled in the art. Nevertheless, it is intended that the scope of the present invention extends to all such modifications, additions, and variations.

The embodiments described herein should be understood to be illustrative in nature and not limiting to the scope of the invention as defined by the appended claims.

What is claimed is:

1. A portable generator cover, comprising:
   a roof portion configured and arranged to sit on top of a frame of a portable generator, and cover the top of the portable generator completely; and
   a single strap to secure the roof portion to the frame of the portable generator, the single strap further being made from a flexible, woven material, the single strap further being vertically secured to an apex of the roof portion and a portion of the frame of the portable generator, the single strap further configured and arranged to apply downward tension between the roof portion and the frame of the portable generator.

2. The portable generator cover of claim 1, wherein the roof portion further comprises having a left side and a right, the left side and right side hinged about a centerline forming an inverted V-shape with an apex.

3. The portable generator cover of claim 1, wherein the single strap is secured horizontally between a left side and a right side of the roof portion, and further configured and arranged to pass under a portion of the frame of the portable generator, the single strap further configured and arranged to apply inward tension to the left side and right side of the roof portion.

4. A portable generator cover, comprising:
   a roof portion having a left side and a right, the left side and right side hinged about a centerline forming an inverted V-shape with an apex;
   a horizontal strap connected to the left side and the right side of the roof portion, the horizontal strap applying inward tension to the left side and right side of the roof portion, the horizontal strap further being made from a flexible, woven material; and
   a vertical strap having one end connected near the apex of the roof portion and having the other end configured and arranged to attach to a frame of a generator, the vertical strap further configured and arranged to apply downward tension between the roof portion and the frame of the portable generator, the vertical strap further being made from a flexible woven material.

5. The portable generator cover of claim 4, wherein the horizontal strap and vertical strap are connected together.

6. The portable generator cover of claim 5, wherein the vertical strap passes through a loop of material formed in the horizontal strap.

7. The portable generator cover of claim 4, wherein one end of the horizontal strap passes through a slot on the left side of the roof portion and is secured thereto, and the other end of the horizontal strap passes through a slot on the right side of the roof portion and is secured thereto.

8. The portable generator cover of claim 7, wherein each end of the horizontal strap further includes a slider directly connected to the left side and right side of the roof portion, respectively, preventing the horizontal strap from releasing from the right side and left side of the roof portion, respectively.

9. The portable generator cover of claim 4, wherein the vertical strap comprises a side release buckle having a female portion and a male portion.

10. The portable generator cover of claim 9, wherein the female portion of the side release buckle is connected to the generator and the male portion of the side release buckle is attached to the vertical strap.

11. The portable generator cover of claim 9, wherein the female portion of the side release buckle is connected to the generator with a zip tie.

12. The portable generator cover of claim 4, wherein the vertical strap is looped through a slot on the left side, over the apex, and through a slot on the right side and is secured to itself.

13. The portable generator cover of claim 12, wherein the vertical strap is secured to itself with a slider.

14. The portable generator cover of claim 4, wherein there are two horizontal straps spaced laterally apart.

15. The portable generator cover of claim 4, wherein there are two vertical straps spaced laterally apart.

16. The portable generator cover of claim 4, wherein the horizontal strap further comprises a slider configured to tension the horizontal strap.

17. The portable generator cover of claim 16, wherein the horizontal strap comprises two spaced-apart sliders configured to tension the horizontal strap.

18. The portable generator cover of claim 4, wherein the roof portion is semi-rigid.

* * * * *